May 15, 1951 S. B. ROSS 2,552,590

TELEPHONE SUPPORT

Filed May 14, 1948 2 Sheets-Sheet 1

INVENTOR

SAMUEL B. ROSS

Strauch & Hoffman

ATTORNEYS

INVENTOR
SAMUEL B. ROSS
Strauch & Hoffman
ATTORNEYS

Patented May 15, 1951

2,552,590

UNITED STATES PATENT OFFICE 2,552,590

TELEPHONE SUPPORT

Samuel B. Ross, Washington, D. C.

Application May 14, 1948, Serial No. 27,075

3 Claims. (Cl. 179—150)

The present invention relates to supports and more particularly to a support for holding a French type telephone or handset in operative position.

It is frequently necessary for a telephone user to have both hands free during a telephone conversation and various makeshift devices have been provided with that end in view. The device in most common use consists of a bracket fastened to the handle of the telephone and the user holds the telephone in operative position between his head and shoulder. This device is not only awkward and uncomfortable but in order to leave the telephone, the user must remove the telephone by hand and replace it by hand to resume the conversation. Other devices having screw clamps and the like are known but because of the inconvenience of operating these clamps the devices have not gone into common use.

I have found that the difficulties and disadvantages of these prior efforts can be overcome by providing a suitable holder and support entirely independent of the user and a clamp which is actuated by merely placing the telephone thereon and released by merely lifting the telephone.

One of the objects of the present invention is to provide a simple, efficient and inexpensive support for securing a handset in operative position.

Another object is to provide a clamp by which a handset may be readily and releasably secured in operative position on a support.

A further object is to provide an adjustable support for a handset in which the weight of the telephone actuates a clamp to hold the telephone in operative position.

A still further object is to provide a handset support which actuates the switch when moved to inoperative position and holds the handset in speaking position when moved to operative position.

Still another object is to provide a support for holding a handset in speaking position which may be folded so as to take up a minimum of space.

These and other objects and advantages reside in novel features of construction, arrangement and combination of parts as will hereinafter be more fully described and pointed out in the appended claims.

Referring to the drawings.

Figures 1, 2, 3, 4, 5, 6:
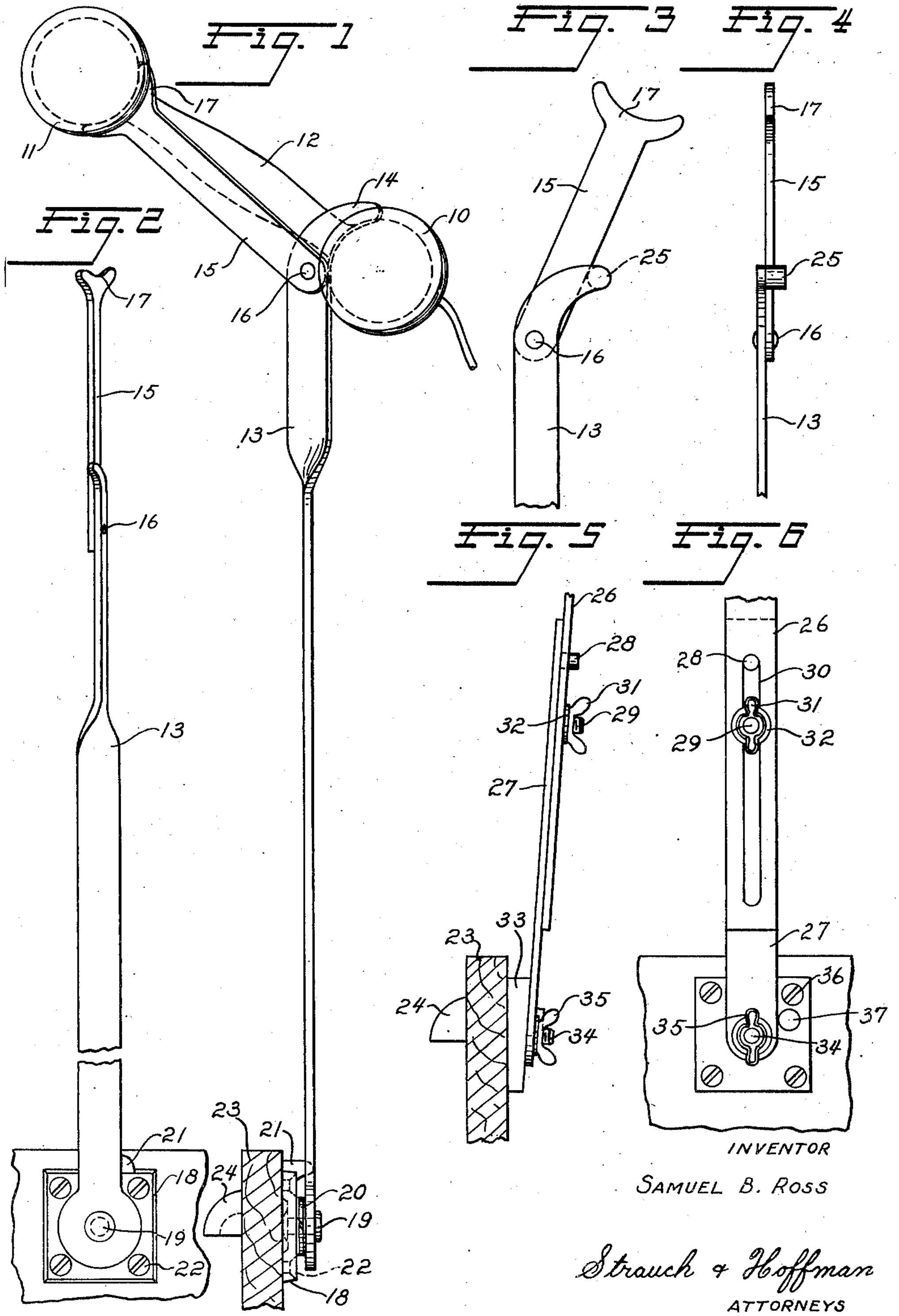
Figure 1 is a side elevation of my improved support showing a handset in place.
Figure 2 is a front elevation of such support.
Figure 3 is a fragmentary side elevation of a modified form of support.
Figure 4 is a fragmentary front elevation of the modified support shown in Figure 3.
Figure 5 is a fragmentary front elevation showing adjustments for the support.
Figure 6 is a fragmentary side elevation of the adjustments shown in Figure 5.

Referring to the drawings Figure 1 shows the support with a handset in place. The handset consists of the usual mouthpiece 10 and receiver 11 connected by a handle 12. The support consists of an upright 13 having at its upper end a curved hook 14 which engages the mouthpiece 10 of the telephone. A link 15 is pivotally secured to the upright 13 by a pivot pin 16 and has at its free end a receiver engaging fork 17. The pivot pin 16 which forms the pivotal axis of the link 15 is spaced laterally from the center of rotation of the mouthpiece 10 in the mouthpiece hook 14.

Figure 9:
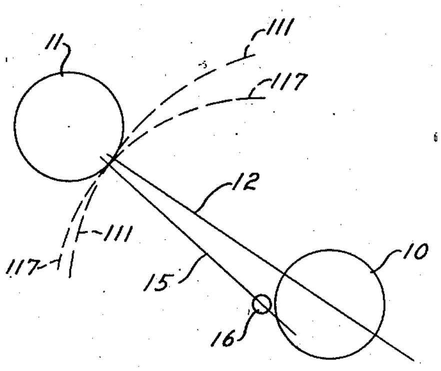
Figure 9 is a diagrammatic illustration of the operation of the clamp.

The clamping action of the support of the present invention can be best understood by reference to Figure 9. The inner edge of the receiver 11 describes an arc 111 when the telephone is pivoted with the mouthpiece 10 in engagement with the hook 14. The link 15 is of such length and the pivot pin 16 is so located that the arc of rotation of the receiver engaging fork 17 indicated at 117 intersects the arc 111. As shown in Figure 9, the center of gravity of the telephone is outside the pivot 16 so that the weight of the telephone tends to rotate the link 15 in a counterclockwise direction until the arcs 111 and 117 intersect at which point the telephone is securely clamped. Merely lifting the telephone serves to release the clamp.

The upright 13 may be mounted on any suitable support such as a flexible tube, lazy tongs or the like. For simplicity of illustration, Figures 1 and 2 show the upright 13 secured to a bracket 18 by a pin 19 and I prefer to use a friction washer 20 between the upright 13 and bracket 18 so that the bracket 13 will remain in selected position. The bracket 18 may be provided with a stop 21 which engages the upright 13 when the upright is in vertical position. The bracket 18 may be secured to any suitable support by screws 22.

The improved support of the present invention is so compact that it may be conveniently secured to the inside of a desk drawer 23 having the usual drawer handle 24 and when not in use, the support may be pivoted about the pin 19 so that it is entirely within the drawer. When the telephone is removed, the link 15 drops of its own weight to a position parallel to the upright 13 so that the entire support takes up a minimum of space along the front edge of the drawer. Of course the support could also be secured to a suitable wall bracket or the like.

Referring to Figures 3 and 4, the outer end of the mouthpiece hook 14 of the upright 13 may be provided with a stop pin 25 for limiting the movement of the link 15. When the upright and link are in the position shown in Figure 3, the receiver 11 may be placed in the receiver fork 17 of the link 15 and the link 15 and telephone move counterclockwise until the mouthpiece 10 engages the mouthpiece hook 14 of the upright 13 as shown in Figure 1.

It may be desirable to provide an upright of variable length so that it may be adjusted for use by persons of different height. One simple form of adjustment is illustrated in Figures 5 and 6 in which the upright 26 is adjustably secured to a member 27. The adjustment mechanism consists of a pin 28 and a screw 29 rigidly fixed on one side of the member 27 and extending through a longitudinal slot 30 in the upright 26. A wing nut 31 threaded on the screw 29 serves to clamp the upright 26 in adjusted position relative to the member 27. If desired, a washer 32 may be used between the wing nut 31 and the upright 26.

The member 27 carrying the upright 26 may be releasably clamped to a bracket 33 rather than frictionally clamped as shown in Figures 1 and 2. One suitable form of releasable clamp is shown in Figures 5 and 6 and consists of a screw 34 fixed to the bracket 33 and extending through a suitable aperture in the lower end of member 27. A wing nut 35 threaded on the screw 34 serves to clamp the member 27 to the bracket 33. The bracket 33 may be secured to the inside of a desk drawer by screws 36 and may be provided with a stop 37. The bracket 33 may be tapered as shown in Figure 5 so as to hold the telephone at more convenient angular position.

The uprights 13 or 26, the link 15 and the member 27 may all be made of any suitable material and I prefer to use rods or stampings or castings of light metal such as aluminum alloy. If desired, a suitable spring may be provided between the link 15 and the upright 13 or the upright 26 to urge the link into upright position but I prefer to omit such a spring since the spring would tend to reduce the clamping due to the weight of the telephone.

Figure 7:
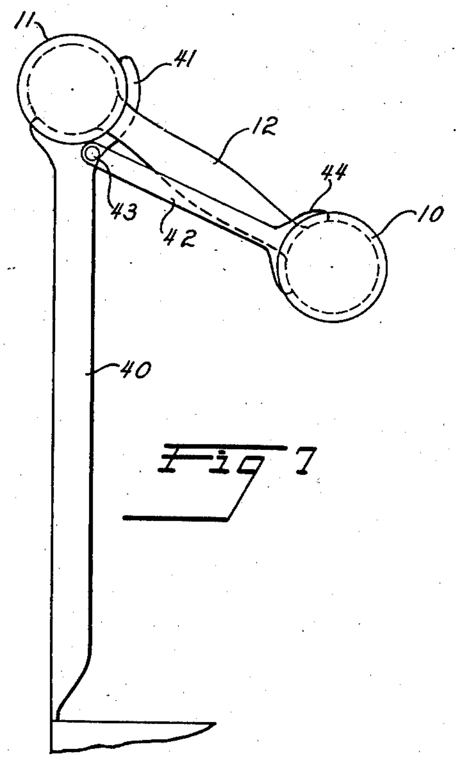
Figure 7 is a side elevation of a modified form of clamp.

In the modification shown in Figure 7 the upright 40 is formed with a large hook 41 for receiving the receiver 11 and a link 42 pivotally connected at 43 to the upright 40 has a portion 44 at its free end for engaging the mouthpiece 10. The operation of this modified form of clamp is substantially identical with that of the clamp shown in Figures 1 to 4. The upright 40 may be secured to any suitable support as shown in Figures 1 to 6 and 8.

Figure 8:
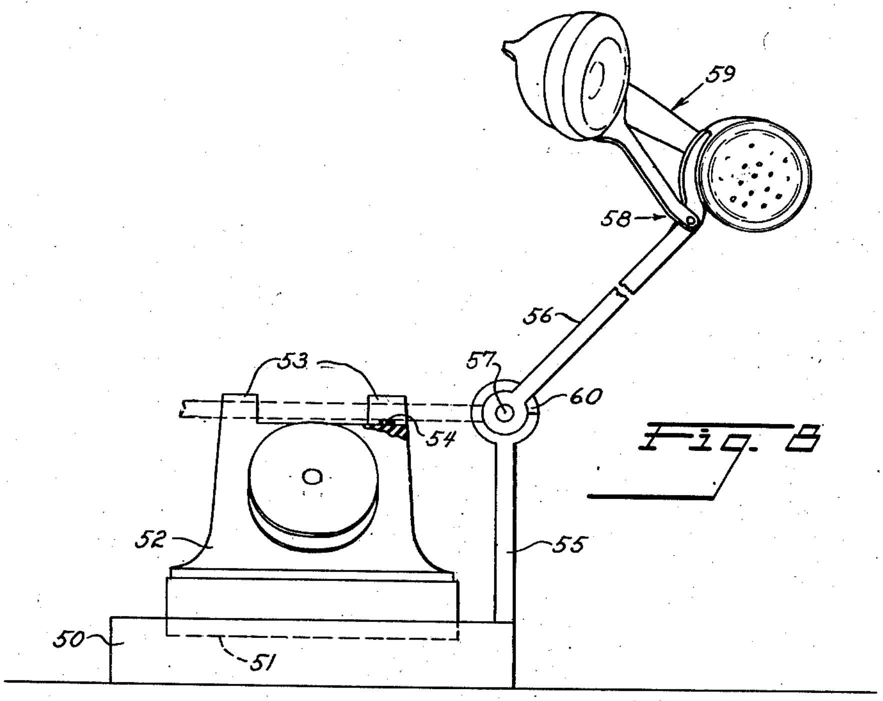
Figure 8 is a front elevation of a modification in which the support operates the telephone switch.

The forms and embodiments previously described serve only to hold the telephone and some means such as a metal bar or weight may be provided to depress the telephone switch when the telephone is not in use. Figure 8 shows a modification in which the upright itself serves to depress the switch when the telephone is not in use.

In this modification I provide a plate 50 which may be recessed at 51 to hold the telephone base 52 in fixed position. The telephone base 52 is of the usual construction having pairs of upstanding arms 53 for receiving the telephone and the usual switch buttons 54 between the arms 53.

A vertical member 55 is fixed to the plate 50 at one side of the base 52 preferably in alignment with the switch buttons 54 and preferably of the same height as the buttons 54 above the plate 50. An arm 56 is pivotally secured to the member 55 by a pin 57 and carries at its upper end a clamp indicated generally at 58 for holding the telephone indicated generally at 59. The clamp 58 may be of the form shown in Figures 1 to 4 or of the form shown in Figure 7.

When the telephone 59 is not in use, the arm 56 carrying the telephone 59 is swung to a substantially horizontal position as indicated in dotted lines in Figure 8 in which position the arm 56 holds the switch buttons 54 depressed. In order to use the telephone, the arm 56 is swung up to the full line position shown in Figure 8 releasing the switch buttons. A projection 60 on the member 54 stops the arm 56 when the telephone is in correct operating position and the upper end of the arm 56 is formed so as to hold the telephone in convenient speaking position.

The simplicity and effectiveness of my improved support are apparent from the foregoing description. The clamp consists of only two relatively movable parts and the weight of the telephone itself urges these parts into clamping engagement with the mouthpiece and receiver ends of the telephone. It is necessary merely to place the telephone on the support and the clamping is automatic without the need of tightening or adjusting screws or bolts and merely lifting the telephone is sufficient to release it from the clamp. In the modification shown in Figures 1 and 4, upon lifting the telephone, the link 15 will drop down parallel to the upright 13 so that the support may be conveniently kept in a desk drawer without taking up substantial space. Despite the simplicity of construction the telephone is positively clamped so that pressure from the user's head or even relatively severe blows will not dislodge it from the support and this clamping action is maintained over a wide range of angular positions of the support.

The position of the clamp relative to the arm is such that the telephone is held in normal speaking position so that the user can talk from a normal, comfortable position and still have both hands free. For users, such as railway ticket clerks and the like, where the simultaneous use of the telephone and both hands is essential and continuous, my improved support results in a substantial increase in comfort and convenience and a substantial reduction in fatigue.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A support for a telephone comprising a handle having a mouthpiece at one end and a receiver at the other comprising an upright having a mouthpiece engaging portion at its upper end and a link pivotally connected at one end to said upright adjacent said mouthpiece engaging portion, said link having a receiver engaging portion at its other end, said link being of such length that the arc of rotation of said link about said pivot intersects the arc of rotation of the receiver about said mouthpiece engaging portion.

2. A support for a telephone having a mouthpiece and a receiver connected by a handle comprising an upright, means at the upper end of said upright for rotatably engaging said mouthpiece, a link pivotally secured at one end to said upright adjacent but spaced from said means, a receiver engaging portion at the other end of said link, the length of said link plus the distance between the pivotal axis of the link and the pivotal axis of the mouthpiece being greater than the length of said handle.

3. A device for holding a telephone handset comprising a mouthpiece member and a receiver member connected by a handle said device comprising a support, an arm pivotally connected at its lower end to said support, means on the upper end of said arm for engaging the inner surface of one of said members adjacent said handle, a link pivotally connected at one end to said arm adjacent said engaging means, means at the other end of said link for engaging the inner surface of the other of said members adjacent said handle, and means including the weight of said handset for urging the two engaging means apart to grip said handset.

SAMUEL B. ROSS.

REFERENCES CITED

The following references are of record in the file of this patent:

UNITED STATES PATENTS

| Number | Name | Date |
|---|---|---|
| 2,260,703 | Daly | Oct. 28, 1941 |

FOREIGN PATENTS

| Number | Country | Date |
|---|---|---|
| 614,816 | France | Apr. 20, 1926 |
| 655,017 | France | May 31, 1928 |
| 80,298 | Switzerland | Mar. 17, 1919 |